US008824537B2

(12) United States Patent
Allpress et al.

(10) Patent No.: US 8,824,537 B2
(45) Date of Patent: Sep. 2, 2014

(54) SIGNAL PROCESSING IN WIRELESS COMMUNICATION RECEIVERS (75) Inventors: Steve Allpress, Bristol (GB); Carlo Luschi, Oxford (GB); Simon Nicholas Walker, Bristol (GB)

(73) Assignee: ICERA Inc., Wilmington, DE (US)

( * ) Notice: Subject to any disclaimer, the term of this patent is extended or adjusted under 35 U.S.C. 154(b) by 0 days.

(21) Appl. No.: 13/574,995

(22) PCT Filed: Jan. 27, 2011

(86) PCT No.: PCT/EP2011/051162
§ 371 (c)(1),
(2), (4) Date: Jul. 24, 2012

(87) PCT Pub. No.: WO2011/092255
PCT Pub. Date: Aug. 4, 2011

(65) Prior Publication Data
US 2012/0294350 A1 Nov. 22, 2012

(30) Foreign Application Priority Data
Jan. 29, 2010 (GB) .................................. 1001469.4

(51) Int. Cl.
*H03H 7/30* (2006.01)
*H04L 25/03* (2006.01)
*H04L 25/02* (2006.01)

(52) U.S. Cl.
CPC ........ *H04L 25/022* (2013.01); *H04L 25/03012* (2013.01); *H04L 25/03044* (2013.01); *H04L 25/03159* (2013.01); *H04L 2025/03426* (2013.01)
USPC ........... 375/229; 375/232; 375/230; 375/346; 375/144; 375/148; 375/316

(58) Field of Classification Search
USPC .......... 375/229, 232, 230, 346, 144, 148, 316
See application file for complete search history.

(56) References Cited

U.S. PATENT DOCUMENTS

| 2001/0033614 | A1 | 10/2001 | Hudson |
| 2002/0037058 | A1* | 3/2002 | Birru .............................. 375/340 |
| 2006/0227886 | A1 | 10/2006 | Li et al. |
| 2007/0058735 | A1* | 3/2007 | Ghosh ........................... 375/260 |
| 2008/0075208 | A1 | 3/2008 | Li et al. |
| 2008/0253432 | A1* | 10/2008 | Kawamoto et al. ........... 375/144 |

FOREIGN PATENT DOCUMENTS

| EP | 1903731 A2 | 3/2008 |
| WO | 2004098138 A1 | 11/2004 |
| WO | 2007059517 A2 | 5/2007 |
| WO | 2011092255 A1 | 8/2011 |

OTHER PUBLICATIONS

Haykin, S. Ed, "Adaptive Filter Theory, Linear Optimum Filters" and "Adaptive Filter Theory", Jan. 1, 2002, XP002352831, ISBN: 978-0-13-048434-5, pp. 3-6 and 385-399.
Foreign Communication From a Counterpart Application, Great Britain Search Report, GB Application No. GB1001469.4, dated Apr. 27, 2010, 3 pages.
Franciso, Ruben, et al., IEEE, "Adaptive Complexity Equalization for the Downlink in WCDMA Systems," 5 pages, 2006.

* cited by examiner

*Primary Examiner* — Zewdu Kassa (57) ABSTRACT

A method, receiver and program for equalizing digital samples of a radio signal received over a wireless communications channel. The method comprises: receiving digital samples of the radio signal; calculating equalizer coefficients in the frequency domain; transforming the equalizer coefficients from the frequency domain to the time domain; and equalizing the digital samples in the time domain using the transformed time domain equalizer coefficients.

24 Claims, 5 Drawing Sheets

SIGNAL PROCESSING IN WIRELESS COMMUNICATION RECEIVERS

CROSS-REFERENCE TO RELATED APPLICATION

This application is the National Stage of, and therefore claims the benefit of, International Application No. PCT/EP2011/051162 filed on Jan. 27, 2011, entitled "SIGNAL PROCESSING IN WIRELESS COMMUNICATION RECEIVERS," which was published in English under International Publication Number WO 2011/092255 A1 on Aug. 4, 2011, and has a priority date of Jan. 29, 2010, based on application GB 1001469.4. Both of the above applications are commonly assigned with this National Stage application and are incorporated herein by reference in their entirety.

This invention relates to signal processing in wireless communication receivers, particularly to equalisation of the wireless channel.

Channel equalization techniques have been widely employed over the last decades for combating intersymbol interference on frequency selective transmission channels. Channel equalisers have recently found application in receivers for Time-Division Multiple Access (TDMA) and Code-Division Multiple Access (CDMA) mobile wireless systems. In particular, in synchronous CDMA cellular systems, as in the case of the forward link of the 3GPP Wideband Code Division Multiple Access (WCDMA) standard, chip-level equalization allows to significantly improve the performance of conventional rake receivers. This improvement is especially important for high rate data transmission, as in 3GPP High-Speed Downlink Packet Access (HSDPA).

Chip-level equalisers for HSDPA receivers are typically linear equalisers based on a transversal filter structure, for both the cases of single-channel and multiple antenna reception. The calculation of chip-level equaliser coefficients is usually based on the Minimum Mean-Square Error (MMSE) criterion, implemented either by an adaptation rule or by block processing as described, for example, in A. Klein, "Data Detection Algorithms Specially Designed for the Downlink of CDMA Mobile Radio Systems", in *Proc. IEEE Vehicular Technology Conference*, vol. 1, Phoenix, Ariz., May 1997, pp. 203-207, R. Love, K. Stewart, R. Bachu, and A. Ghosh, "MMSE Equalization for UMTS HSDPA", *IEEE Vehicular Technology Conference*, vol. 4, Orlando, Fla., October 2003, pp. 2416-2420, and M. Heikkila, P. Komulainen, and J. Lilleberg, "Interference Suppression in CDMA Downlink through Adaptive Channel Equalization", in *Proc. IEEE Vehicular Technology Conference*, vol. 2, Amsterdam, The Netherlands, September 1999, pp. 978-982. For most conditions, linear equalisers provide a good trade-off between performance and computational complexity, but their operation is seriously limited in the presence of specific channel conditions. For instance, Baud-spaced single channel linear equalization cannot cope with channel zeros close to the unit circle of the z-plane. In the presence of excess-bandwidth transmission, this problem can be mitigated by the use of fractionally-spaced equalization, where operation is only limited by the presence of common zeros among the different subchannels.

The performance of single-channel and receive diversity equalization can also be improved by a nonlinear equaliser structure, as, e.g., with decision-feedback equalization. However, in the case of an HSDPA receiver, besides possible issues of decision-error propagation, the implementation of a decision-feedback equaliser requires a significant additional cost.

With respect to the calculation of the equaliser coefficients, the conventional MMSE criterion has the disadvantage of relying on specific assumptions on the statistics of the input disturbance (noise-plus-interference). In this respect, a more robust approach may be provided by computing the equaliser coefficients based on the Least-Squares (LS) criterion as described, for example, in S. Haykin, *Adaptive Filter Theory*, Upper Saddle River, N.J.: Prentice Hall, 2001, and S. M. Kay, *Fundamentals of Statistical Signal Processing, Vol. I: Estimation Theory*, Upper Saddle River, N.J.: Prentice Hall, 1993.

Figure 1:
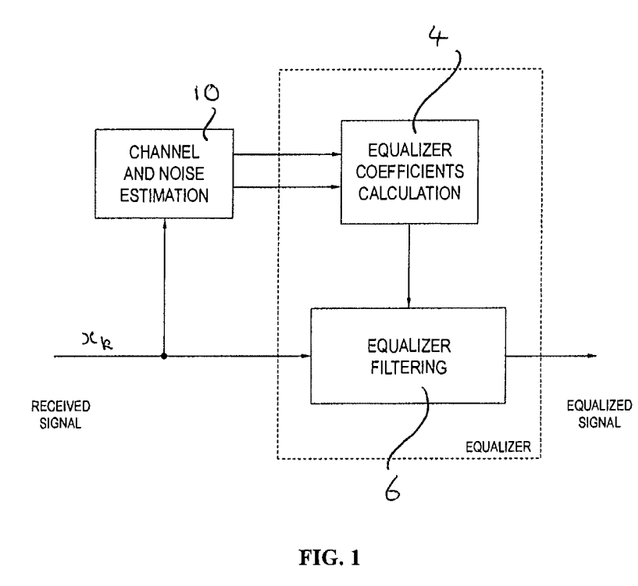
FIG. 1 is a schematic block diagram of a time-domain MMSE equaliser.
Figure 2:
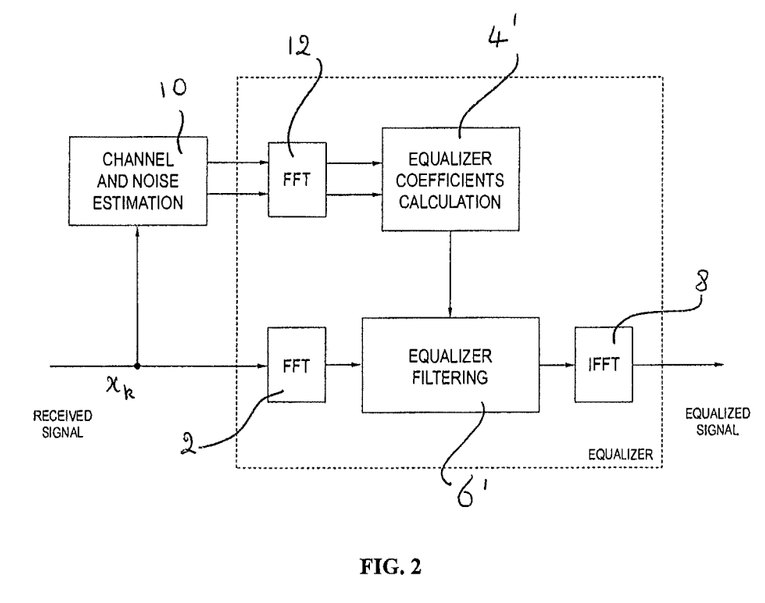
FIG. 2 is a schematic block diagram of a frequency-domain MMSE equaliser.

Conventional equalisers are implemented either in the time domain or in the frequency domain. The block diagrams of time-domain and frequency-domain implementations of an MMSE equaliser are shown in FIG. 1 and FIG. 2, respectively. FIG. 1 shows a time-domain equaliser implementation, where the input signal $x_k$ is applied to equaliser filtering for deriving equaliser output samples. The equaliser input signal $x_k$ is also used for the calculation of the equaliser coefficients 4, based on channel and noise estimation values derived in 10. FIG. 2 gives the block diagram of a frequency-domain equaliser implementation, where the equaliser input signal $x_k$ is converted to the frequency domain by a Discrete Fourier Transform (DFT), which can be efficiently implemented by means of a Fast Fourier Transform (FFT) 2. In this case, both the calculation 4 of the equaliser coefficients and the equaliser filtering and derivation of the equaliser output samples 6 are performed in the frequency domain, and the equaliser output is then converted back to the time domain by means of Inverse FFT (IFFT) 8. The calculation of the equaliser coefficients can be based on channel and noise estimation values 10 converted to the frequency domain by the FFT 12.

Denote by $W_k$, $H_k$ and $N_k$, $k=0, \ldots, N_f-1$ the DFT of the equaliser coefficients, the sampled equivalent channel impulse response and the noise autocorrelation function, respectively. Then, for an MMSE frequency domain equaliser, one obtains the frequency domain equaliser coefficients $$W_k = \frac{H_k^*}{|H_k|^2 + \frac{1}{\sigma_d^2} N_k}, \tag{1}$$

where $\sigma_d^2$ is the received signal power from a serving base station (which in the case of a WCDMA/HSDPA receiver corresponds to the variance of the transmitted composite chip sequence). Then, equalization of a block of data is performed by computing the DFT of the received signal samples, multiplying the frequency domain signal by the frequency domain equaliser coefficients $W_k$, and finally computing the inverse DFT of the resulting frequency domain equalized signal. In general, the values of the frequency domain channel response $H_k$ and noise spectral density $N_k$ may be obtained by DFT of the time domain estimates of channel impulse response and noise autocorrelation function. Alternatively, depending on the pilot symbols design, the samples $H_k$ and $N_k$ may be directly estimated in the frequency domain. Note that, depending on the coherence time of the channel, the equaliser coefficients $W_k$ may not always need to be recomputed for each DFT block of the signal.

If the interference-plus-noise samples at the input of the receive filter are modelled as a white Gaussian process with zero mean and variance $\sigma_n^2$, then denoting by $G_k$, $k=0, \ldots, N_f-1$ the DFT of the sampled receive filter impulse response $g_l$, one has $$N_k = \sigma_n^2 |G_k|^2 \tag{2}$$

and (1) becomes $$W_k = \frac{H_k^*}{|H_k|^2 + \frac{\sigma_n^2}{\sigma_d^2}|G_k|^2}, \quad (3)$$

where $|G_k|^2=1$ for $k=0, \ldots, N_f-1$ if the receive filter impulse response is the exact square-root of a Nyquist filter response.

The above equations describe the frequency-domain equaliser design for M=1 Baud-spaced subchannels (chip-rate subchannels in the case of a WCDMA/HSDPA receiver). With M≥2 Baud-spaced subchannels (chip-rate subchannels in the case of a WCDMA/HSDPA receiver), e.g., in the case of a fractionally-spaced linear equaliser with $T_c/M$ spaced coefficients, or in the case of a receive diversity equaliser for M receive antennas, Equations (1) and (3) can be rewritten as M separate formulas for the frequency domain equaliser coefficients $W_k^{(m)}$ corresponding to the M subchannels $H_k^{(m)}$, $m=0, \ldots, M-1$. For example, for a dual antenna receive diversity equaliser, assuming the same noise level and the same receive filter response on the two diversity branches, Equation (3) becomes $$W_k^{(0)} = \frac{H_k^{(0)*}}{|H_k^{(0)}|^2 + |H_k^{(1)}|^2 + \frac{\sigma_n^2}{\sigma_d^2}|G_k|^2} \quad (4)$$

$$W_k^{(1)} = \frac{H_k^{(1)*}}{|H_k^{(0)}|^2 + |H_k^{(1)}|^2 + \frac{\sigma_n^2}{\sigma_d^2}|G_k|^2}$$

In the case of LS equaliser, denote by $P_k$ and $R_k$, $k=0, \ldots, N_f-1$ the DFT of the cross-correlation between received signal and transmitted data vector, and of the auto-correlation of the received signal, respectively. Then, one computes the frequency domain equaliser coefficients $$W_k = \frac{P_k}{R_k}, \quad (5)$$

and for M=2 Baud-spaced subchannels (chip-rate subchannels in the case of a WCDMA/HSDPA receiver)

$$W_k^{(0)} = \frac{P_k^{(0)} R_k^{(1,1)} - P_k^{(1)} R_k^{(0,1)*}}{R_k^{(0,0)} R_k^{(1,1)} - |R_k^{(0,1)}|^2} \quad (6)$$

$$W_k^{(1)} = \frac{P_k^{(1)} R_k^{(0,0)} - P_k^{(0)} R_k^{(0,1)}}{R_k^{(0,0)} R_k^{(1,1)} - |R_k^{(0,1)}|^2}$$

As mentioned above, the operations of DFT and inverse DFT can be efficiently implemented by means of $N_f$-point Fast Fourier Transform (FFT) and Inverse Fast Fourier Transform (IFFT).

When combined with FFT processing and the use of a cyclic prefix, a single-carrier system with frequency domain equalization has essentially the same performance and low complexity of an Orthogonal Frequency-Division Multiplexing (OFDM) system. The insertion of a cyclic prefix (i.e., the repetition at the beginning of the block of the last data symbols of the same block, for a duration that exceeds the maximum expected channel delay spread) is essential for both an OFDM system and a single-carrier frequency domain equaliser, since it prevents intersymbol interference from the data of the previous block, and makes the received block appear periodic with period $N_f$—this produces the appearance of a circular convolution, which is necessary for the correct implementation of the linear convolution of the equaliser filter through an FFT operation.

If data transmission does not include a cyclic prefix, frequency domain equalization may still be implemented by partitioning and reassembling the data based on overlap-save or overlap-add techniques, at the expense of an additional implementation cost.

A frequency-domain implementation of the equaliser has generally the advantage of a reduced computational complexity with respect to a time-domain design. In fact, denoting by N the number of time domain equaliser coefficients per subchannel, the calculation of the equaliser coefficients in the frequency domain has the advantage of requiring $2 MN_f$ real divisions instead of the inversion of a matrix of dimensions MN×MN. Avoiding the inversion of the MN×MN matrix is attractive, since the implementation of a matrix inversion is particularly costly.

Frequency-domain processing can also reduce the cost associated with the equaliser filtering by exploiting the efficiency of the FTT/IFFT operation, especially when the number of equaliser coefficients is large.

Therefore, the frequency-domain design corresponds in general to a reduced computational complexity with respect to a time-domain implementation, especially when the number of equaliser taps is large. However, the above cost saving decreases for shorter equalisers, and is further decreased in the case where the absence of a cyclic prefix in the received signal requires the implementation of overlap-and-save or overlap-and-add techniques.

Broadly speaking, the equaliser time span should be designed to be at least greater than the maximum channel delay spread—with a linear equaliser, for specific realizations of the channel amplitude and phase characteristics, the required number of equaliser coefficients may be several times the length of the channel. For a frequency-domain equaliser making use of a cyclic prefix, it should also be considered that the FFT block length should be several times longer than the maximum channel delay spread, in order to minimize the transmission overhead due to the insertion of the cyclic prefix.

It is an aim of the invention to provide an improved channel equaliser.

In one aspect, the invention provides a method of equalising digital samples of a radio signal received over a wireless communications channel comprising:
    receiving digital samples of the radio signal;
    calculating equaliser coefficients in the frequency domain;
    transforming the equaliser coefficients from the frequency domain to the time domain;
    equalising the digital samples in the time domain using the transformed time domain equaliser coefficients.

In another aspect, the invention provides an equaliser for use in a wireless radio receiver and comprising:
    means for receiving digital samples of a radio signal received over a wireless communications channel;
    means for calculating equaliser coefficients in the frequency domain;
    means for transforming the equaliser coefficients from the frequency domain to the time domain and,
    means for equalising the digital samples in the time domain using the transformed equaliser coefficients.

The invention also provides a wireless receiver comprising a receiver arranged to execute a code sequence implementing an equalising method as hereinbefore defined, and a computer program product for implementing the method when executed by the processor.

A hybrid time-domain/frequency-domain equaliser design is discussed in the following, where the calculation of the equaliser coefficients is performed in the frequency domain, converted to the time domain by IFFT, and then used by a time-domain equaliser filter. A novel spectral regularization technique can be applied in the frequency domain to constrain the time span of the resulting time-domain equaliser tap-weights vector.

The proposed approach is particularly advantageous for the implementation of linear equalisers with relatively small number of coefficients.

For a better understanding of the present invention and to show how the same may be carried into effect, reference will now be made by way of example to the accompanying drawings, in which.

A hybrid time-domain/frequency-domain equaliser implementation is described, where the calculation of the equaliser coefficients is performed in the frequency domain, converted to time domain by IFFT, and then used by a time-domain equaliser filter. The equaliser can be located in a wireless receiver which can be embodied in a mobile terminal or a base station.

Figure 3:
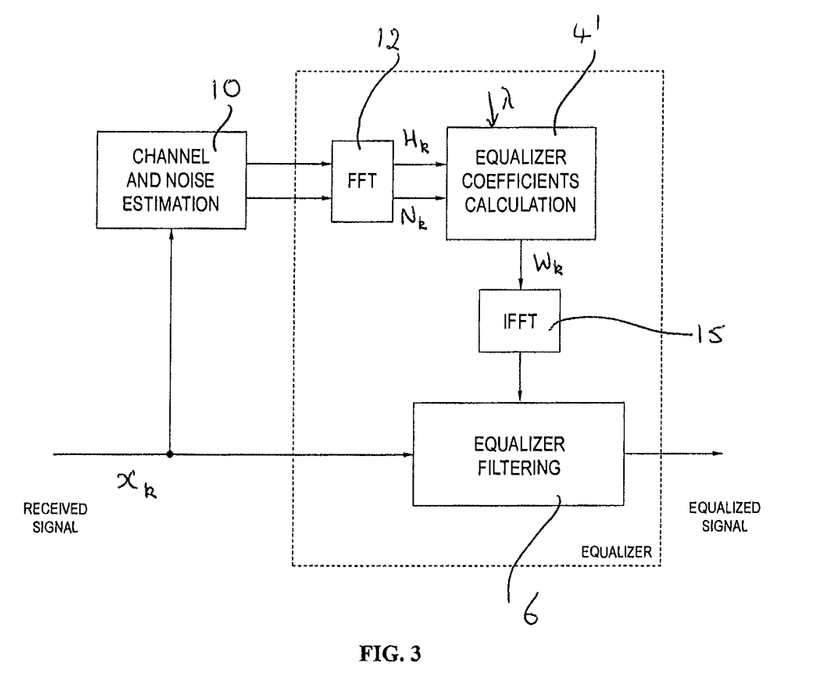
FIG. 3 is a block diagram of a hybrid time-domain/frequency-domain MMSE equaliser.

FIG. 3 is a block diagram illustrating the concept of hybrid time-domain/frequency-domain equaliser applied to the case of MMSE equalisation. As in FIG. 2, a channel and noise estimation function 10 supplies values in the time domain to a Fast Fourier Transform (FFT) 12 which transforms them into the frequency domain for calculation of the equaliser coefficients 4'. A notable difference between the architecture of FIG. 3 and architecture of FIG. 2 however, is that the received signal $x_k$ is supplied to an equaliser filtering function 6 which operates in the time domain. The equaliser coefficients are transformed from the frequency domain to the time domain using the Inverse FFT (IFFT) 15, and then supplied to the equaliser filtering function 6.

Denoting by $W_k$, $H_k$ and $N_k$, k=0, ..., $N_f$−1 the FFT respectively of the equaliser coefficients $w_l$, the sampled equivalent channel impulse response $h_l$ and the noise auto-correlation function, the frequency-domain MMSE equaliser coefficients are still given by Equations (1) or (3) already discussed. In general, the values of the frequency domain channel response $H_k$ and noise spectral density $N_k$ may be obtained by FFT of the time domain estimates of channel impulse response and noise autocorrelation function. Alternatively, depending on the pilot symbols design, the samples $H_k$ and $N_k$ may be directly estimated in the frequency domain.

As in the case of the frequency-domain design of FIG. 2, with M≥2 Baud-spaced subchannels (chip-rate subchannels in the case of a WCDMA/HSDPA receiver), for instance in the case of a fractionally-spaced linear equaliser with $T_c$/M spaced coefficients, or in the case of a receive diversity equaliser for M receive antennas, Equations (1) and (3) can be rewritten as M separate formulas for the frequency domain equaliser coefficients $W_k^{(m)}$ corresponding to the M subchannels $H_k^{(m)}$, m=0, ..., M−1, see, e.g., Equation (4).

In the case of an MMSE equaliser, as an alternative to the implementation of FIG. 3, the quantity $|H_k^{(m)}|^2$ of Equations (1), (3) or (4) may be obtained as FFT of channel impulse response correlation computed in the time domain.

Figure 4:
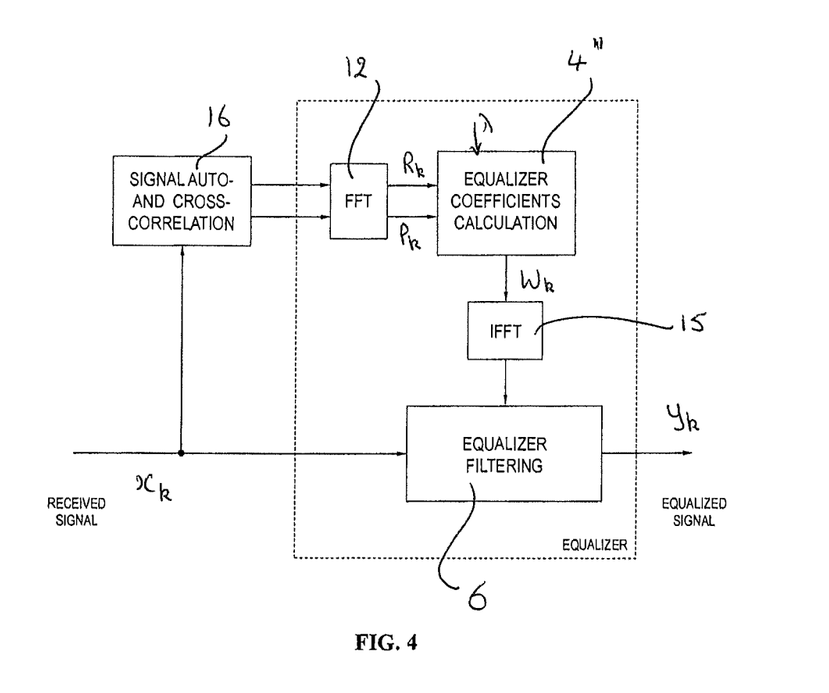
FIG. 4 is a schematic block diagram of a hybrid time-domain/frequency-domain LS equaliser.
Figure 5:
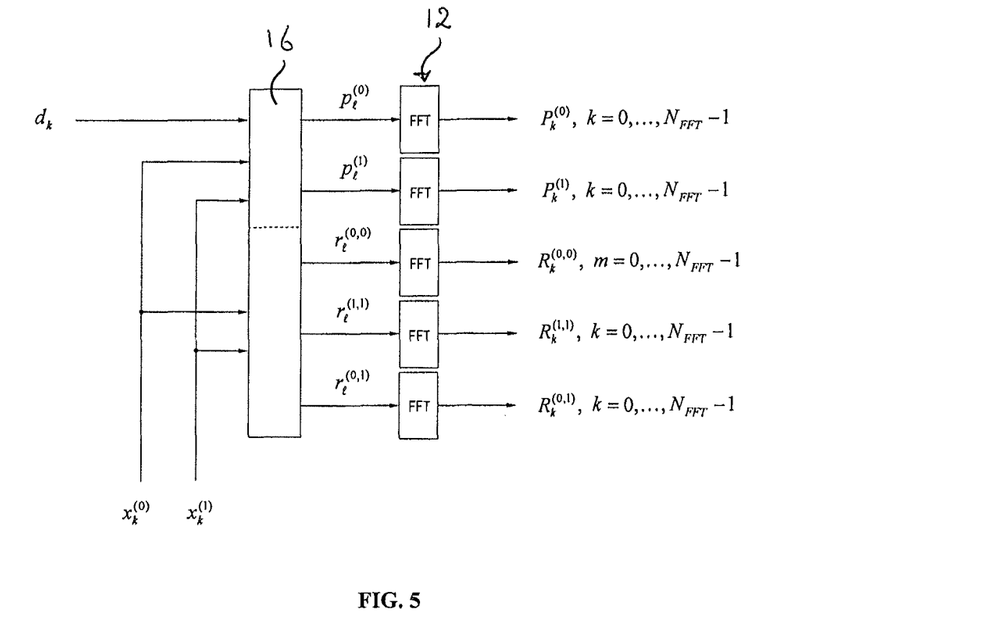
FIG. 5 is a schematic block diagram of the calculation of cross correlation and auto correlation functions of a hybrid time-domain/frequency-domain LS equaliser (for M=2 subchannels)

FIG. 4 represents a schematic block diagram of a hybrid time-domain/frequency-domain LS equaliser. As in the architecture of FIG. 3, an FFT 12 transforms into the frequency domain time domain values derived from the time-domain received signal $x_k$. In this case, however, the values arise from computing in the time domain the auto- and cross-correlations between the input signal $x_k$ and data vectors $d_k$, as also shown in FIG. 5 (block 16). The equaliser coefficients calculation function 4" of FIG. 4 calculates the LS equaliser coefficients in the frequency domain, and an IFFT function 15 converts them to the time domain, to be used by the time-domain equaliser filtering function 6. As an alternative to the architecture of FIG. 4, for the case of an LS equaliser the auto and cross correlations of the input signal and data vectors may be calculated in the frequency domain.

FIG. 5 is a schematic block diagram showing in more detail the calculation of the cross correlations and auto correlation functions of the input signal $x_k$ with the data vector $d_k$. The FFT 12 of FIG. 4 is more explicitly shown in FIG. 5 as a set of transform functions each corresponding to a specific correlation.

In the case of a LS equaliser, while the calculation in the frequency domain of the auto- and cross-correlations of the input signal(s) vectors may correspond to a computational saving, there is a performance and computational advantage in computing in the time domain the correlation between input signal(s) and data vectors. We consider the two cases where i) both the auto-correlation of the received signal and the cross-correlation between the received signal and the transmitted data are computed in the time domain and then transformed to the frequency domain, and ii) only one of the above two quantities (for instance the cross-correlation) is computed in the time domain and then transformed to the frequency domain, with the other quantity directly computed in the frequency domain.

The calculation in the frequency domain of the input signal correlations $R_k$, k=0, ..., $N_f$−1 in Equation (5) or $R_k^{(m_1,m_2)}$, $m_1,m_2$=1, 2, k=0, ..., $N_f$−1 in Equation (6) requires the availability of the Fourier transform of the input signal. Consider for simplicity the case M=1, and denote by $r_l$, l=0, ..., N−1 the time averaged auto-correlation of the input signal $x_k$, $$r_l = \frac{1}{K - N + 1} \sum_{k=N-1}^{K-1} x_k x_{k-l}^*, \quad (7)$$

where K is the number of input samples (per subchannel). One observes that the data block length K in Equation (7) is much larger than the output block length N, so that it would not be efficient to choose a Fourier transform size of the order of K. In order to use a smaller Fourier transform size, the sum in Equation (7) can be broken into sections of length N $$r_l = \frac{1}{K-N+1} \sum_{i=0}^{N-1} r_{i,l} \tag{8}$$

where $$r_{i,l} = \sum_{k=0}^{N-1} x_{k+N-1+iN} x^*_{k+N-1+iN-l} \tag{9}$$

with $l=0, \ldots, N-1$, $i=0, \ldots, L-1$, and $LN=K-N+1$. Then, we define $$x_{i,k} = \begin{cases} x_{k+N-1+iN} & k = 0, \ldots, N-1 \\ 0 & k = N, \ldots, 2N-1 \end{cases} \tag{10}$$

$$z_{i,k} = x_{k+N-1+iN} \quad k = N, \ldots, 2N-1. \tag{11}$$

With this notation we write $$r_{i,l} = \sum_{k=0}^{2N-1} z_{i,k} x^*_{i,k-l} \quad l = 0, \ldots, N-1 \tag{12}$$

and considering the cyclic correlation $$s_{i,l} = \sum_{k=0}^{2N-1} z_{i,k} x^*_{i,k-l} \quad l = 0, \ldots, 2N-1 \tag{13}$$

we have $$r_{i,l} = s_{i,l}, l=0, \ldots, N-1. \tag{14}$$

Letting $X_{i,k}$ and $Z_{i,k}$ denote the DFT respectively of $x_{i,k}$ and $z_{i,k}$, we can compute $$S_{i,k} = Z_{i,k} \cdot X^*_{i,k} \tag{15}$$

or, observing that $z_{i,k} = x_{i,k} + x_{i+1, k-N}$ (see, e.g., R. E. Blahut, *Fast Algorithms for Digital Signal Processing*, Reading, Mass.: Addison-Wesley, 1985)

$$S_{i,k} = [X_{i,k} + X_{i+1,k} e^{-j2\pi kN/2N}] \cdot X^*_{i,k} \tag{16}$$
$$= [X_{i,k} + (-1)^k X_{i+1,k}] \cdot X^*_{i,k}.$$

To obtain the correlation $r_l$ in the time domain, one would derive the quantity $$S_k = \frac{1}{LN} \sum_{i=0}^{L-1} S_{i,k} \tag{17}$$

and retain half of the values $s_l$ obtained by computing the inverse Fourier transform of $S_k$ (overlap-save).

We note that, in situations where the block length N is significantly greater than the maximum correlation lag at which $r_l$ is appreciably different from zero, an acceptable approximation of the frequency domain samples $R_k$ can be obtained by considering the quantities $$\tilde{s}_{i,l} = \sum_{k=0}^{N-1} x_{i,k} x^*_{i,k-l} \quad l = 0, \ldots, N-1 \tag{18}$$

and simply computing $$\tilde{S}_{i,k} = X_{i,k} \cdot X^*_{i,k} \tag{19}$$

and $$R_k \approx \frac{1}{LN} \sum_{i=0}^{L-1} \tilde{S}_{i,k}. \tag{20}$$

The approximation in Equation (20) could be improved by compensating with a suitable scaling for the fact that the calculation (20) at lag l accumulates only a fraction (N−l)/N of non-zero signal products with respect to the original expression (13).

Figure 6:
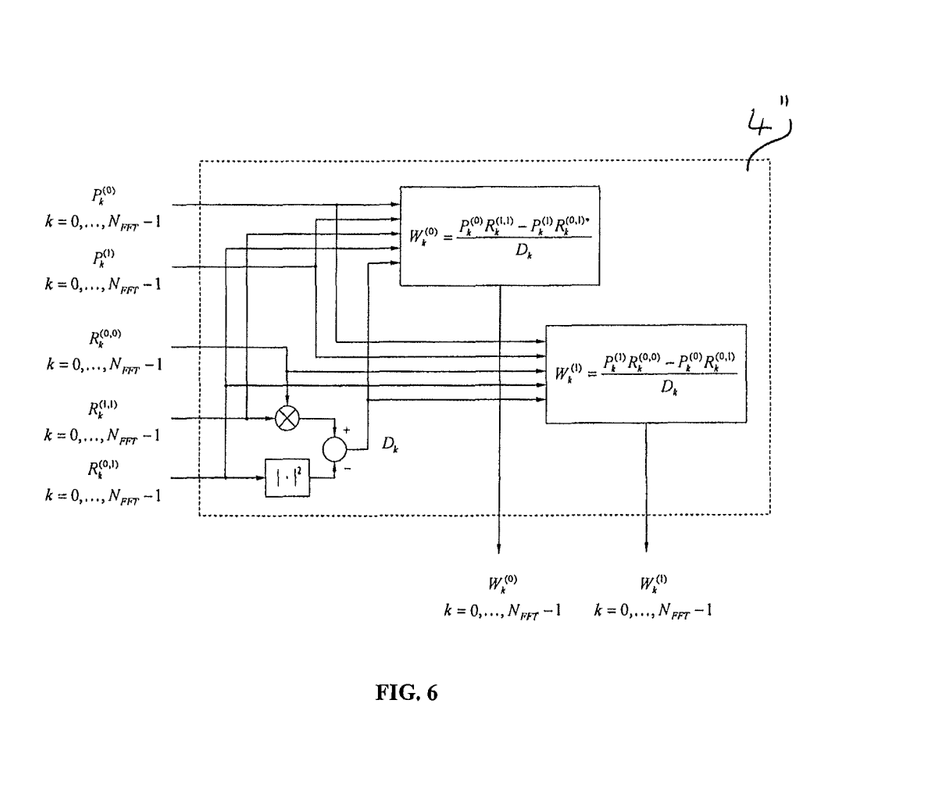
FIG. 6 is a schematic block diagram of the calculation of frequency-domain coefficients of a hybrid time-domain/frequency-domain LS equaliser (for M=2 subchannels)

FIG. 6 is a schematic block diagram showing in more detail the calculation of the frequency-domain equaliser coefficients function 4" of a hybrid time-domain/frequency-domain LS equaliser for M=2 chip-rate subchannels.

Figure 7:
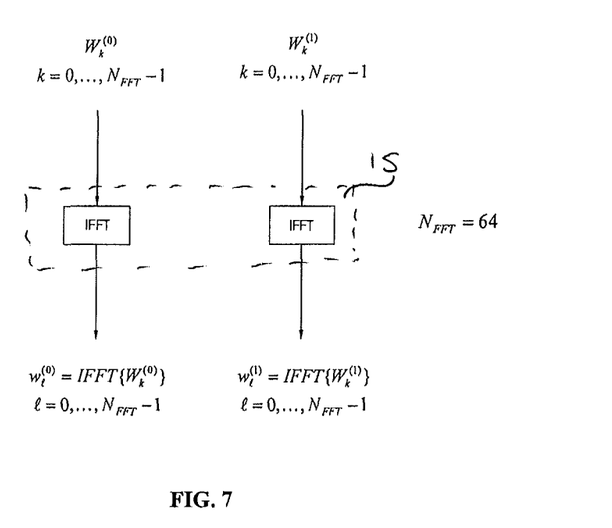
FIG. 7 is a schematic block diagram of the calculation of time domain coefficients of a hybrid time-domain/frequency-domain equaliser (for M=2 subchannels)

FIG. 7 shows in more detail the calculation of the time domain equaliser coefficients of the hybrid time-domain/frequency-domain LS equaliser for M=2 chip-rate subchannels. The IFFT function 15 is shown as two separate functions, producing the Fourier transform of the coefficients of each of the signal subchannels.

Figure 8:
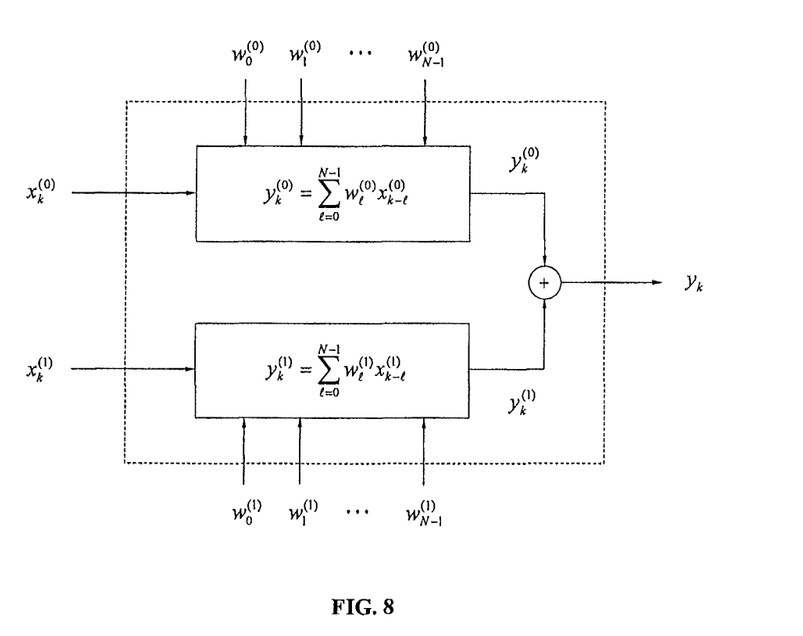
FIG. 8 is a schematic block diagram of equaliser filtering of a hybrid time-domain/frequency-domain equaliser (for M=2 subchannels)

FIG. 8 is a schematic block diagram illustrating in more detail the equaliser filtering function 6 of the hybrid time-domain/frequency-domain LS equaliser for M=2 chip-rate subchannels.

Figure 9:
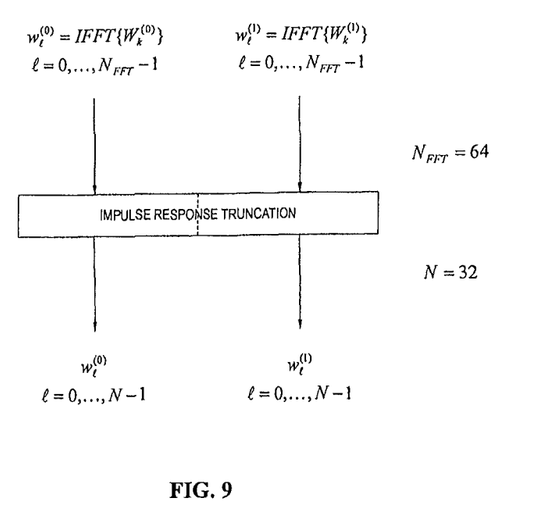
FIG. 9 is a schematic block diagram of impulse response truncation of a hybrid time-domain/frequency-domain equaliser (for M=2 subchannels).

The above hybrid time-domain/frequency-domain design implies that the number N of equaliser coefficients for time-domain filtering should be equal to the IFFT size $N_f$. This condition can be relaxed for instance by truncation of the time-domain equaliser response obtained by IFFT as shown, for example, in FIG. 9. This simple approach could be advantageous to further limit the cost of time-domain filtering. However, this approach is suboptimum: a truncation of the original equaliser impulse response will generally cause a reduction of the equaliser capability to counteract Inter-Symbol Interference (ISI), and hence a degradation of the equaliser performance. Clearly, this performance degradation corresponds to the energy loss caused by the truncation of the equaliser length from $N_f$ to N.

The performance degradation associated with the truncation of the equaliser impulse response after IFFT can be significantly reduced by means of spectral regularization.

We observe that the truncation of the equaliser impulse response will cause a degradation of the equaliser performance only if it has produced a non negligible energy loss with respect to the original equaliser impulse response of length $N_f$.

It follows that, to reduce the energy loss caused by truncation, the original equaliser impulse response of length $N_f$ should be made to have energy concentrated in a time window of length N around the reference equaliser coefficient. This can be achieved by a simple spectral regularization, which consists in modifying the calculation of the frequency-domain equaliser coefficients by the addition of a fixed noise term, corresponding to the power spectral density of a virtual additive white noise. For instance, with spectral regularization Equation (1) becomes $$W_k = \frac{H_k^*}{|H_k|^2 + \frac{1}{\sigma_d^2}N_k + \lambda}, \quad (21)$$

where $\lambda$ is the regularization coefficient. Similarly, Equation (5) is rewritten as $$W_k = \frac{P_k}{R_k + \lambda}. \quad (22)$$

The presence of an additional virtual white noise term will smooth the resulting equaliser frequency-domain response, reducing the slope of the amplitude and phase transitions (i.e., reducing the 'spectral' component of the frequency response)—this will in turn reduce the time span of the corresponding equaliser impulse response.

The above described embodiment are examples of a new generic concept of a hybrid time-domain/frequency-domain equaliser, so that a designer has the possibility of implementing more efficient trade-offs with respect to what can be achieved based on conventional time-domain or frequency-domain equalisers. For example, in the case of a HSDPA chip-level equaliser, where the maximum delay spread in urban environment is typically below 5 μs, the number of coefficients N of a linear chip-spaced equaliser should be greater than 20. For values of N as small as 64 or 32, the cost saving of a frequency domain design becomes relatively small. In particular, while it is clearly always advantageous to avoid the implementation of a matrix inversion in the computation of the equaliser coefficients, the cost saving of frequency-domain filtering with respect to time-domain filtering can easily disappear in the presence of specific architectures of the receiver hardware platform that are capable of efficient parallel processing. Known prior art considers equaliser implementations either entirely in the time-domain or entirely in the frequency domain. This includes MMSE equalisers, LS equalisers, and equalization strategies based on other cost functions.

The embodiments also provide a solution to a possible problem of performance degradation associated with the choice of a time domain filter length shorter that the FFT size, by using spectral regularization.

The proposed equaliser implementations have the following advantages:
  Reduced computational complexity in the absence of a cyclic prefix, especially for the implementation of linear equalisers with relatively small number of coefficients.
  Calculation of equaliser coefficients in the frequency domain in the absence of a cyclic prefix, without the need overlap-save or overlap-add techniques.
  Performance and computational advantage for LS equalization in the time domain calculation of the correlation between input signal(s) and data vectors.
  Reduced performance degradation due to a possible reduction of the time domain equaliser filter by simple use of regularization.

The invention is applicable to wireless communication systems potentially affected by inter-symbol interference, and generally to any application that may benefit from equalization techniques.

It will be appreciated that the implementing means described herein, such as calculating means, transforming means, equalising means, etc., can be implemented in any suitable manner, either in hardware or software. When in software, they can be implemented by code sequences stored in a memory and executed by a processor.

The invention claimed is:

1. A method of equalising digital samples of a radio signal received over a wireless communications channel comprising:
  receiving digital samples of the radio signal;
  calculating equaliser coefficients in the frequency domain, said calculating comprising regularising the equaliser coefficients by including a fixed regularisation parameter;
  transforming the equaliser coefficients from the frequency domain to the time domain;
  truncating the number of time domain equaliser coefficients from a first number to a second number, said first number being equal to the size of a transform function implementing the transforming step;
  equalising the digital samples in the time domain using the transformed time domain equaliser coefficients.

2. The method as claimed in claim 1, wherein equalising is MMSE equalising.

3. The method according to claim 2, comprising transforming time domain channel coefficients into the frequency domain for calculating the equalisation coefficients.

4. The method according to claim 2, comprising transforming time domain noise estimation values into the frequency domain for calculating the equalisation coefficients.

5. The method according to claim 2, comprising estimating channel coefficients in the frequency domain for calculating the equaliser coefficients.

6. The method according to claim 2, comprising estimating noise spectral density coefficients in the frequency domain for calculating the equaliser coefficients.

7. The method according to claim 2, wherein the calculating step uses a parameter derived from the frequency response of the equivalent receive filter.

8. The method as claimed in claim 1, wherein equalising is Least Squares (LS) equalising.

9. The method as claimed in claim 8, comprising transforming correlated values from said digital samples from the time domain into the frequency domain for calculating the equaliser coefficients.

10. The method as claimed in claim 8, comprising transforming correlated values from said digital samples and at least one data vector from the time domain into the frequency domain for calculating the equaliser coefficients.

11. The method as claimed in claim 8, comprising transforming the digital samples from the time domain into the frequency domain and calculating correlated values in the frequency domain for calculating the equaliser coefficients.

12. An equaliser for use in a wireless radio receiver and comprising:
  means for receiving digital samples of a radio signal received over a wireless communications channel;
  means for calculating equaliser coefficients in the frequency domain, said calculating comprising supplying a fixed regularisation parameter to regularise the equaliser coefficients;

means for transforming the equaliser coefficients from the frequency domain to the time domain;

means for truncating the number of time domain equaliser coefficients from a first number to a second number, said first number being equal to the size of a transform function implemented by said transforming step; and, means for equalising the digital samples in the time domain using the transformed time domain equaliser coefficients.

13. The equaliser according to claim 12, wherein the means for calculating the equaliser coefficients operates in accordance with MMSE equalisation.

14. The equaliser according to claim 13, comprising means for transforming time domain channel coefficients into the frequency domain and supplying the transformed channel coefficients to the calculating means.

15. The equaliser according to claim 13, comprising means for transforming time domain noise estimation values into the frequency domain and supplying the transformed channel coefficients to the calculating means.

16. The equaliser according to claim 12, comprising means for estimating channel coefficients in the frequency domain and supplying the estimated channel coefficients to the calculating means.

17. The equaliser according to claim 12, comprising means for estimating noise spectral density coefficients in the frequency domain and supplying the estimated channel coefficients to the calculating means.

18. The equaliser according to claim 12, wherein the calculating means operates in accordance with Least Squares (LS) equalisation.

19. The equaliser according to claim 18, comprising means for correlating the digital samples in the time domain, and means for transforming the correlated values into the frequency domain and supplying the transformed correlated values to the calculating means.

20. The equaliser according to claim 18, comprising means for correlating the digital samples and at least one data vector in the time domain, and means for transforming the correlated values into the frequency domain and supplying the transformed correlated values to the calculating means.

21. The equaliser according to claim 12, wherein the means for transforming the equaliser coefficients into the time domain comprises an Inverse Fast Fourier Transform.

22. A wireless receiver comprising a processor arranged to execute a code sequence for implementing a method of equalizing, said method comprising:

receiving digital samples of the radio signal;

calculating equaliser coefficients in the frequency domain, said calculating comprising regularising the equaliser coefficients by including a fixed regularisation parameter;

transforming the equaliser coefficients from the frequency domain to the time domain;

truncating the number of time domain equaliser coefficients from a first number to a second number, said first number being equal to the size of a transform function implementing the transforming step; and equalising the digital samples in the time domain using the transformed time domain equaliser coefficients.

23. A computer program product comprising program code stored on a non-transitory computer readable medium which, when executed by a processor, implements a method of equalising according to claim 1.

24. A wireless receiver comprising an equaliser according to claim 12.

* * * * *